(12) United States Patent
Morisaki

(10) Patent No.: US 9,896,085 B2
(45) Date of Patent: Feb. 20, 2018

(54) VEHICLE INFORMATION PROCESSOR

(71) Applicant: TOYOTA JIDOSHA KABUSHIKI KAISHA, Toyota-shi, Aichi-ken (TW)

(72) Inventor: Keisuke Morisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 15/018,154

(22) Filed: Feb. 8, 2016

(65) Prior Publication Data

US 2016/0257294 A1 Sep. 8, 2016

(30) Foreign Application Priority Data

Mar. 4, 2015 (JP) ................................ 2015-042645

(51) Int. Cl.

| | |
|---|---|
| *B60K 6/00* | (2006.01) |
| *B60L 11/00* | (2006.01) |
| *F01D 15/00* | (2006.01) |
| *F02D 29/06* | (2006.01) |
| *B60W 20/00* | (2016.01) |
| *B60W 10/06* | (2006.01) |
| *B60W 20/12* | (2016.01) |
| *B60W 20/13* | (2016.01) |
| *B60W 10/08* | (2006.01) |
| *B60W 10/26* | (2006.01) |
| *B60K 6/445* | (2007.10) |

(52) U.S. Cl.
CPC ............ *B60W 20/12* (2016.01); *B60K 6/445* (2013.01); *B60W 10/06* (2013.01); *B60W 10/08* (2013.01); *B60W 10/26* (2013.01); *B60W 20/13* (2016.01); *B60W 2400/00* (2013.01); *B60W 2550/14* (2013.01); *B60W 2550/143* (2013.01); *B60W 2550/402* (2013.01); *B60W 2710/06* (2013.01); *B60W 2710/08* (2013.01); *B60W 2710/244* (2013.01); *Y02T 10/6239* (2013.01); *Y02T 10/6269* (2013.01); *Y02T 10/6286* (2013.01); *Y02T 10/7258* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2005/0228553 A1* | 10/2005 | Tryon | ............ B60K 6/46 701/22 |
| 2012/0010768 A1 | 1/2012 | Phillips et al. | |
| 2015/0275787 A1* | 10/2015 | Dufford | ........ F02D 29/02 701/102 |

FOREIGN PATENT DOCUMENTS

| | | |
|---|---|---|
| JP | 2007-050888 A | 3/2007 |
| JP | 2008-247318 A | 10/2008 |
| JP | 2009-012605 A | 1/2009 |
| JP | 2014-097762 A | 5/2014 |
| JP | 2014-151718 A | 8/2014 |
| JP | 2014-191456 A | 10/2014 |

(Continued)

*Primary Examiner* — Adam D Tissot
(74) *Attorney, Agent, or Firm* — Oliff PLC

(57) ABSTRACT

In the first mode, the vehicle gives priority to traveling in which only the motor is driven. In the second mode, the vehicle drives at least one of the internal combustion engine and the motor to sustain a stored power amount of the storage battery. At least one of a plurality of zones includes a load unknown portion, in which the travel load cannot be calculated. The planning unit is configured to set a zone including the load unknown portion to the first mode.

4 Claims, 7 Drawing Sheets

(56) References Cited

FOREIGN PATENT DOCUMENTS

| | | |
|---|---|---|
| JP | 2015-030407 A | 2/2015 |
| JP | 2015-209113 A | 11/2015 |
| WO | 2013/132640 A1 | 9/2013 |

* cited by examiner

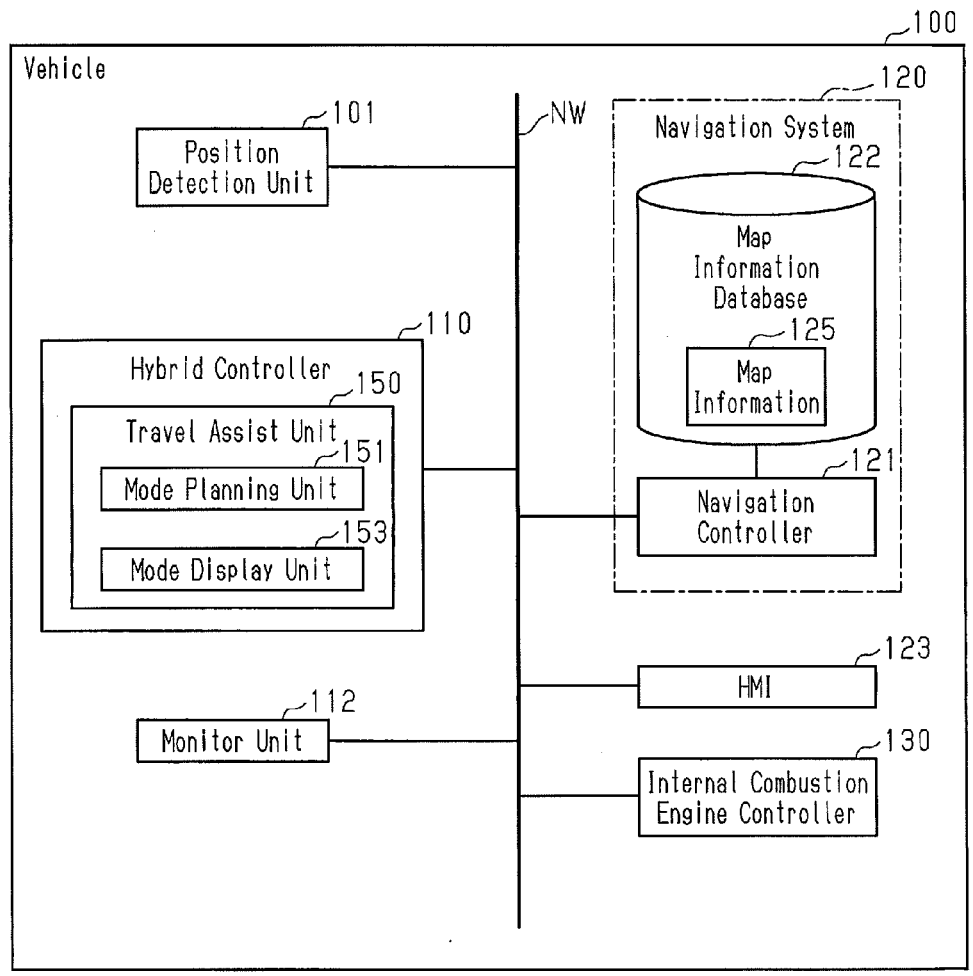

VEHICLE INFORMATION PROCESSOR

BACKGROUND OF THE DISCLOSURE

The present disclosure relates to a vehicle information processor that processes information related to the application of a plurality of vehicle travel modes.

A plug-in hybrid vehicle is well known in the art as a vehicle that uses an internal combustion engine and a motor as drive sources. The plug-in hybrid vehicle uses electric power transmitted from an external power supply to charge a storage battery (battery), which functions as a power source of the motor.

A typical plug-in hybrid vehicle is driven in a plurality of drive source control modes. Known examples of such modes include a charge depleting (CD) mode, which functions as a first mode, and a charge sustaining (CS) mode, which functions as a second mode.

The CD mode gives priority to the consumption of the power stored in the battery rather than sustainment of the power stored in the battery. Thus, the CD mode gives priority to electric vehicle (EV) traveling, in which only the motor is driven when the vehicle travels. The CS mode gives priority to sustainment of the battery power rather than consumption of the battery power. Thus, in the CS mode, at least one of the internal combustion engine and the motor is driven to sustain the power stored in the battery at a predetermined target value.

Studies have been conducted to divide a travel route from a route origin to a route destination into a plurality of zones and plan which mode is to be set for each zone. It is desirable for a plug-in hybrid vehicle to decrease the frequency in which the internal combustion engine is driven and extend the distance of EV traveling. Thus, the mode is planned to decrease the frequency in which the internal combustion engine is driven.

Japanese Laid-Open Patent Publication No. 2009-12605 describes an example of a vehicle controller for a vehicle having the function described above. The controller stores the average speed of each zone that is calculated from the travel history of the vehicle. Additionally, when planning the modes for a travel route, the controller sets a mode (HV mode) that gives priority to hybrid vehicle (HV) traveling, in which the internal combustion engine and the motor are both driven, for zones having a high average speed.

Additionally, the controller sets a mode (EV mode) that gives priority to EV traveling for the remaining zones. In this case, the EV mode is set so that the stored power amount of the battery is proximate to and above the lower limit at the route destination.

SUMMARY

It is an object of the present disclosure to provide an information processor that is used for a vehicle and capable of forming a plan to increase consumption of the stored power even when the travel load of a zone cannot be calculated.

One aspect of the present disclosure provides an information processor for use with a vehicle that includes an internal combustion engine and a motor, which function as drive sources, and a storage battery, which functions as a power source of the motor. The information processor includes a travel route obtaining unit, a zone information obtaining unit, and a planning unit. The travel route obtaining unit is configured to obtain a travel route, including a plurality of zones, from a route origin to a route destination.

The zone information obtaining unit is configured to obtain zone information used to calculate a travel load of each of the zones included in the travel route. The planning unit is configured to calculate the travel load of each of the zones, which are included in the travel route, using the zone information. The planning unit is configured to set each zone to one of a first mode and a second mode based on the travel load. In the first mode, the vehicle gives priority to traveling in which only the motor is driven. In the second mode, the vehicle drives at least one of the internal combustion engine and the motor to sustain a stored power amount of the storage battery. When at least one of the zones includes a load unknown portion in which the travel load cannot be calculated, the planning unit is configured to set the zone including the load unknown portion to the first mode.

In the above configuration, a zone including the load unknown portion is set to the first mode, in which the consumption power amount is larger than when traveling in the second mode. Thus, for example, when the actual travel load of the zone including the load unknown portion is small, the zone will not be set to the second mode, in which the consumption power amount is relatively small. Therefore, when the vehicle travels along the travel route and the mode is selected as planned, the consumption of the stored power amount is increased. This limits a situation in which the actual stored power amount is surplus relative to the planned stored power amount when the vehicle reaches the route destination. Thus, even when the load unknown portion exists, a plan is formed to increase the consumption of the stored power.

When planning one of the modes for each zone, the zones may include a zone provided with no information, such as the average speed. For example, when planning the modes for a travel route, the travel load on the vehicle for each zone may be calculated using the altitude of the zone, and the travel load may be used to plan one of the modes for the zone. Here, the altitude is basically geographic information. Thus, it is difficult to obtain the altitude, for example, when a route extends through structures like a bridge or a tunnel.

In this regard, when it is difficult to obtain the altitude of a location, the altitude of a proximate location may be used to calculate a temporary travel load and plan the mode based on the travel load. However, when the travel load is calculated in such a manner, the difference in the travel load between the temporary travel load and the actual travel load may result in the stored power amount of the battery being surplus when the vehicle reaches the route destination. Thus, the stored power amount of the battery would differ from the stored power amount that was planned at the route destination. The stored power amount of the battery that is surplus from the amount that was planned for the route destination suggests that the internal combustion engine had been driven more often than expected. This is not preferred in the viewpoint of extending the distance of EV traveling and reducing fuel consumption and emissions.

The above problem is not limited to a process for planning one of the modes using altitudes and generally occurs in any technique that plans one of the modes based on the travel load. The above-mentioned information processor solves this problem.

In one mode of the information processor, the planning unit is configured to calculate a zone power consumption amount for each zone based on the calculated travel load. The zone power consumption amount is an amount of power that is consumed when the vehicle travels in the first mode. The planning unit is configured to obtain a total power amount that is allowed to be output from the storage battery before reaching a lower limit value of the stored power amount. The planning unit is configured to assign one or more zones, in order from zones having smaller loads, with a power amount of the corresponding zone power consumption amount that is taken from the obtained total power amount. The planning unit is configured to set the one or more zones, to which a power amount taken from the total power amount is assigned, to the first mode. In addition to the one or more zones set to the first mode by assigning the power amount taken from the total power amount, when a zone including the load unknown portion is set to the first mode, the planning unit is configured not to assign a power amount taken from the total power amount to the zone including the load unknown portion.

In the above configuration, the total power amount is assigned only to a zone in which the zone power consumption amount can be calculated based on the travel load. Thus, when a zone including the load unknown portion is set to the first mode, the total power amount is not assigned to the zone including the load unknown portion. Therefore, when the vehicle is traveling, the stored power amount may be insufficient relative to the planned stored power amount. However, the surplus stored power amount of the battery is limited when the vehicle reaches the route destination.

In one mode of the information processor, when a proportion of a length of the load unknown portion relative to an overall length of the zone including the load unknown portion is greater than or equal to a predetermined proportion, the planning unit is configured to entirely set the zone including the load unknown portion to the first mode.

It is assumed that the load unknown portion of a zone may be short relative to the overall length of the zone depending on how the zone is divided. In the above configuration, the first mode is set only in a zone in which the proportion of the load unknown portion is greater than or equal to the predetermined proportion. This prevents a situation in which the first mode is set in a zone in which the travel load of the load unknown portion subtly affects the average travel load of the entire zone. Thus, the surplus stored power amount is limited when the vehicle reaches the route destination. Also, when the vehicle is traveling, situations are limited in which the stored power amount is insufficient relative to the planned stored power amount.

In the above information processor, preferably, the planning unit is configured to set the load unknown portion to the first mode, and in the zone including the load unknown portion, the planning unit is configured to set a portion other than the load unknown portion to one of the first mode and the second mode based on the travel load of the portion other than the load unknown portion.

In the above configuration, the load unknown portion and a portion other than the load unknown portion as separate zones. Thus, when a zone includes the load unknown portion, the mode is planned in the portion other than the load unknown portion in accordance with the travel load. This limits the surplus stored power amount when the vehicle reaches the route destination and insufficiency in the stored power amount relative to the planned stored power amount when the vehicle is traveling.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 3 is a schematic block diagram showing the configuration of the first embodiment of the vehicle information processor;

FIG. 4 is a conceptual diagram showing one example of the configuration of link information;

DESCRIPTION OF THE PREFERRED EMBODIMENTS

First Embodiment

A first embodiment of an information processor for a vehicle will now be described with reference to FIGS. 1 to 9.

Figure 1:
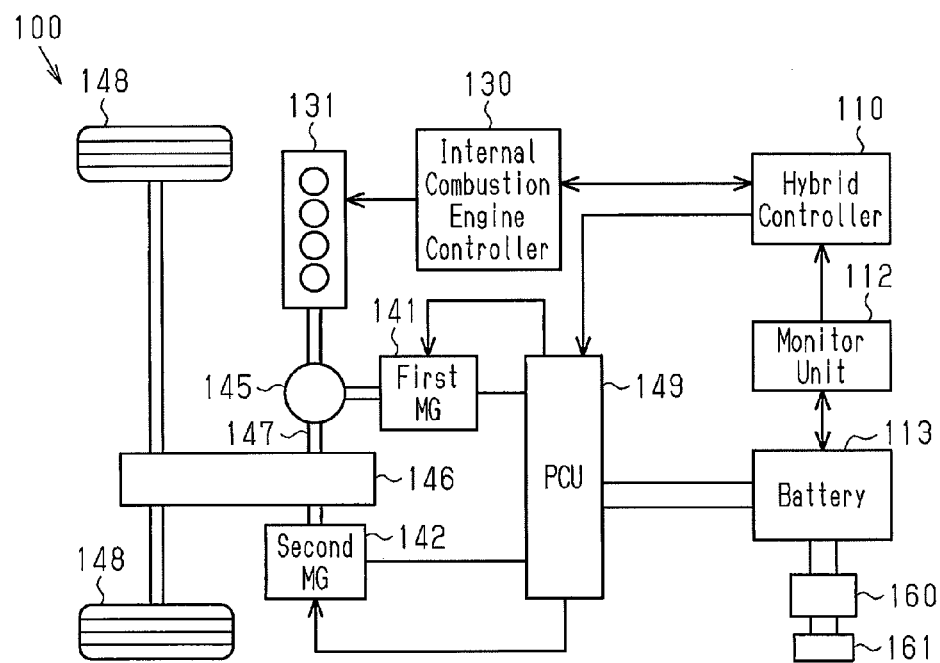
FIG. 1 is a schematic block diagram showing the structure of a vehicle in which a first embodiment of a vehicle information processor is installed.

The schematic structure of a vehicle to which an information processor for a vehicle is applied will now be described with reference to FIG. 1. A vehicle 100 is a plug-in hybrid automobile that uses an internal combustion engine 131 and a second motor generator 142 (second MG), which is a motor, as drive sources.

The internal combustion engine 131 is mechanically coupled to drive wheels 148 by a power distribution mechanism 145 and a reduction mechanism 146. The internal combustion engine 131 is controlled by an internal combustion engine controller 130.

The power distribution mechanism 145 includes a planetary gear having a ring gear, a pinion gear, a sun gear, and a planetary carrier. The power distribution mechanism 145 distributes drive force, which is generated by the internal combustion engine 131, to an output shaft 147 and a first motor generator 141 (first MG).

The first motor generator 141 generates power from the drive force, which is generated by the internal combustion engine 131 and distributed by the power distribution mechanism 145. The power generated by the first motor generator 141 is transmitted to a battery 113 through a power control unit 149 (PCU). The power transmitted from the first motor generator 141 charges the battery 113.

Alternatively, the power generated by the first motor generator 141 is used to drive the second motor generator 142. The first motor generator 141 also operates as a motor. The first motor generator 141 activates the internal combustion engine 131 using power supplied from the battery 113 through the PCU 149.

The battery 113 is a rechargeable secondary battery. The battery 113 is connected to a monitor unit 112. The monitor unit 112 calculates the state of charge (SOC), which is the proportion of the stored power amount relative to the fully charged amount, based on the voltage of the battery 113, the amount of current flowing through the battery 113, or the like.

The PCU 149 includes an inverter, a boost converter, and the like. The inverter converts power of the battery 113 into alternating current when supplied to the second motor generator 142 and also converts power of the first motor generator 141 into direct current when transmitted to the battery 113. The boost converter converts the voltage between the battery 113 and the inverter.

The second motor generator 142 is mechanically coupled to the drive wheels 148 by the reduction mechanism 146. The second motor generator 142 is driven by power supplied from the battery 113 through the PCU 149 and power supplied from the first motor generator 141 to rotate the drive wheels 148. Thus, the second motor generator 142 assists the internal combustion engine 131. Also, the second motor generator 142 drives the vehicle 100 using only its own drive force. The power distribution of the first motor generator 141, the second motor generator 142, and the internal combustion engine 131 is set by a hybrid controller 110.

Additionally, when the brake is applied on the vehicle 100, the second motor generator 142 performs regenerative braking to generate power using the drive force transmitted from the drive wheels 148. The power generated by the second motor generator 142 is supplied to the battery 113 through the PCU 149.

The battery 113 may also be charged by power supplied from an external power supply. The battery 113 is connected to a charge inlet 161 by a charging unit 160. The charge inlet 161 is connected to a connector of a charge cable connected to the external power supply (not shown). The charging unit 160 converts power supplied from the external power supply through the charge inlet 161 into the voltage level of the battery 113 and supplies the voltage to the battery 113.

Figure 2:
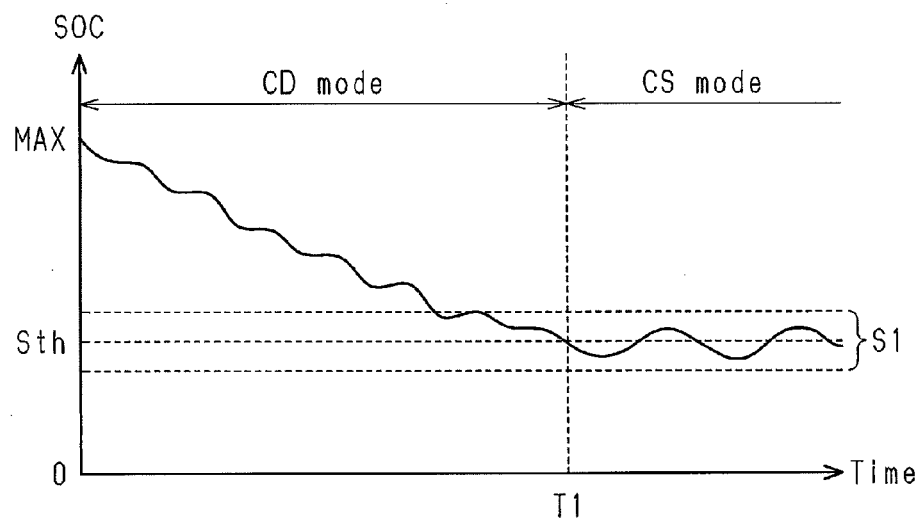
FIG. 2 is a graph showing control modes of the vehicle in the first embodiment.

As shown in FIG. 2, the vehicle 100 travels in two modes to control the drive sources. A first mode is a CD mode in which priority is given to consumption of power stored in the battery 113 rather than sustainment of the stored power amount. The CD mode gives priority to EV traveling, which uses only the second motor generator 142 to drive the vehicle and limits the driving of the internal combustion engine 131 is driven. The limitation of the driving of the internal combustion engine 131 includes a cylinder deactivation, in which combustion is deactivated in some or all of the cylinders of the internal combustion engine 131. Here, even during the CD mode, the HV traveling is performed, for example, when the acceleration pedal is greatly depressed by the driver to increase a load or the internal combustion engine 131 is warmed up.

A second mode is a CS mode in which priority is given to sustainment rather than consumption of power of the battery. In the CS mode, at least one of the internal combustion engine 131 and the second motor generator 142 is driven to sustain the SOC of the battery 113 within a predetermined range S1 in which a target value Sth is the mean value. More specifically, in the CS mode, in addition to when the load is high or when the engine is being warmed, the HV traveling is performed to sustain the SOC of the battery 113 within the predetermined range S1. More specifically, when the SOC of the battery 113 exceeds the target value Sth, priority is given to the EV traveling, in which the second motor generator 142 is driven to consume power of the battery 113. Additionally, when the SOC of the battery 113 is below the target value Sth, the internal combustion engine 131 is driven to generate power with the first motor generator 141 and charge the battery 113. Thus, in the CD mode, in which priority is given to the EV traveling, the amount of power consumed from the battery 113 per unit time or unit distance tends to be greater than that of the CS mode.

The electrical configuration of the vehicle 100 including the information processor for a vehicle will now be described with reference to FIG. 3.

The hybrid controller 110 is connected to an in-vehicle network NW such as a controller area network (CAN) and transmits an instruction to the internal combustion engine controller 130 through the in-vehicle network NW. Additionally, the hybrid controller 110 controls the driving of the first motor generator 141 and the second motor generator 142 through the PCU 149, which is shown in FIG. 1.

The hybrid controller 110 and the internal combustion engine controller 130 each include a computer having an arithmetic unit and a memory. The arithmetic unit arithmetically processes programs and parameters, which are stored in the memory, to perform various kinds of control.

The vehicle 100 also includes a position detection unit 101, which detects the position of the vehicle 100. The position detection unit 101 includes, for example, an antenna for satellite navigation such as a global positioning system (GPS) antenna, and calculates the latitude and longitude of the current position or the like. The position detection unit 101 is connected to the in-vehicle network NW and outputs information indicating the current position. In addition to or instead of a GPS satellite signal, the position detection unit 101 may be configured to detect the current position of the vehicle 100 using a satellite signal other than GPS or a signal obtained through road-vehicle communication.

The vehicle 100 also includes a navigation system 120, which guides a travel route of the vehicle 100. The navigation system 120 is connected to the in-vehicle network NW. The navigation system 120 includes a map information database 122, which stores map information 125, and a navigation controller 121. The navigation controller 121 includes a computer having an arithmetic unit and a memory. The arithmetic unit arithmetically processes programs and parameters, which are stored in the memory, to perform various kinds of controls.

The map information 125 includes node information, which is related to nodes indicating positions on roads, link information, which is related to links connecting two adjacent nodes, and altitude information, which is used to calculate the travel load of the vehicle 100. The altitude information corresponds to zone information. The navigation controller 121 uses the map information 125 to perform a guide process on a travel route of the vehicle 100.

The navigation controller 121 obtains information indicating the current position of the vehicle 100 from the position detection unit 101 to specify the current position. Additionally, when a route destination is set, for example, by the driver, the navigation controller 121 searches a travel route from the route origin of the vehicle 100 to the route destination using Dijkstra's algorithm or the like with reference to the map information database 122. Although the route origin of the vehicle 100 generally corresponds to the current position of the vehicle 100, the route origin may be set separately from the current position. For example, when the vehicle 100 is located in a building, the entrance of the building may be set as the route origin. Additionally, the navigation controller 121 transmits the entire link information included in the searched travel route and the altitude information corresponding to the travel route to the hybrid controller 110 through the in-vehicle network NW.

The vehicle 100 also includes a human machine interface 123 (HMI). The HMI 123 is a device that notifies various kinds of information to the person in the vehicle 100 and includes, for example, a display showing an image or a speaker outputting a sound. The HMI 123 is connected to the in-vehicle network NW and outputs information obtained from the hybrid controller 110 and the navigation system 120. Additionally, the HMI 123 transmits a signal to the hybrid controller 110 and the navigation system 120 in response to an input operation of the person in the vehicle 100.

The link information 126, which is used to calculate the travel load, will now be described with reference to FIG. 4. The link information 126 includes a link identifier 126a of each link, which identifies the link, and a connection node 126b of each link, which indicates the identifier of a node connected to the link. The link information 126 also includes a link length 126c and a link cost 126d of each link. Each link length 126c indicates the length of the link. Each link cost 126d includes an average movement time, an average movement speed, and the like.

The link information 126 also includes an attribute flag 126e of each link. Each attribute flag 126e indicates whether or not a certain structure such as a bridge or a tunnel is located on the road corresponding to the link. Each attribute flag 126e includes one or more flags. The flag may be provided for each kind of structures, for example, a flag indicating whether or not a bridge exists and another flag indicating whether or not a tunnel exists. Alternatively, a flag may merely indicate whether or not a structure exists. When the certain structure exists, the attribute flag 126e is set to, for example, "1." When the certain structure does not exist, the attribute flag 126e is set to, for example, "0."

The link information 126 further includes attribute information 126f of each link. The attribute information 126f includes a traveling direction of a road. Additionally, when the certain structure such as a bridge or a tunnel is located on the corresponding link, the attribute information 126f includes the position of the structure on the link and the length of the structure.

The function of the hybrid controller 110 will now be described in detail. The hybrid controller 110 determines an output required by the driver based on detection results or the like of an acceleration sensor, a vehicle speed sensor, and an accelerator sensor (not shown) and sets the distribution of drive force for the internal combustion engine 131 and the second motor generator 142 in accordance with the required output. Additionally, the hybrid controller 110 controls the second motor generator 142 through the PCU 149 and transmits information related to a control amount of the internal combustion engine 131 to the internal combustion engine controller 130 based on the distribution of drive force.

Additionally, the hybrid controller 110 determines braking force required by the driver based on detection results of the acceleration sensor, the vehicle speed sensor, and a brake sensor (not shown) and sets the distribution of the braking force for a brake system, which generates braking force using hydraulic pressure or the like, and the second motor generator 142 based on the required braking force. Additionally, the hybrid controller 110 controls the second motor generator 142 and transmits information related to a control amount of the brake system to the brake system based on the distribution of braking force.

As shown in FIG. 3, the hybrid controller 110 also includes a travel assist unit 150, which outputs drive assist information of the travel route. The travel assist unit 150 includes an information processor for a vehicle.

The travel assist unit 150 includes a mode planning unit 151 and a mode display unit 153. The mode planning unit 151 corresponds to a travel route obtaining unit, a zone information obtaining unit, and a planning unit. The mode planning unit 151 obtains a travel route, which is divided into zones, from the navigation controller 121 and sets each zone to the CD mode or the CS mode. Here, the links serve as the zones, which are subject to mode setting. However, the zones may be obtained by dividing the road in equal intervals or divided at change points of a longitudinal slope or a radius of curvature. Moreover, other zones may be used as long as the travel load can be calculated.

When setting the CD mode or the CS mode, the mode planning unit 151 calculates the travel load corresponding to each zone using the link information and the altitude information, which are included in the map information 125. The travel load indicates the average of a load applied to the drive sources per unit distance. The travel load is, for example, an estimated average of the consumption power amount per unit distance during the EV traveling or an estimated average of the consumption fuel amount per unit distance when only the internal combustion engine 131 drives the vehicle. The travel load may be an estimated value of the maximum value or the minimum value of such variables.

Alternatively, the travel load is calculated from the travel speed of each zone and an output torque of the second motor generator 142 during the EV traveling or an output torque of the internal combustion engine 131 when only the internal combustion engine 131 drives the vehicle. For example, when a zone includes an upward slope, the calculated travel load of the zone is large. When a zone includes a downward slope, the calculated travel load of the zone is small.

A mode planning function of the mode planning unit 151 will now be described in detail with reference to FIG. 5. The mode planning unit 151 determines a change in a longitudinal slope of the road from the altitude information. The altitude information indicates level lines of an area within the recorded range of the map information 125. Here, the altitude information basically needs to indicate the height of geography and may indicate information other than the level lines such as information associating the altitude obtained from the level line with the absolute position such as the latitude and longitude or information associating the altitude obtained from the level line with the link and the node.

The mode planning unit 151 determines an upward slope when the altitude increases in the traveling direction and a downward slope when the altitude decreases in the traveling direction. Additionally, the travel assist unit 150 calculates a travel load Ln per unit distance through a predetermined calculation process using the longitudinal slope of the link and the link cost 126d. More specifically, when the link includes an upward slope, the calculated travel load Ln is large. When the link includes a downward slope, the calculated travel load Ln is small. In addition to the longitudinal slope, the average movement speed included in the link cost 126d may be used to calculate the travel load Ln. In this case, when a zone has a relatively high average movement speed such as a highway, the calculated travel load Ln of the zone is large. When a zone has a relatively low average movement speed such as a downtown, the calculated travel load Ln of the zone is small.

Further, the mode planning unit 151 uses the travel load Ln and the link length 126c to estimate a power amount that is consumed when traveling from the initial point to the terminal point of the link and sets the estimated power amount as a zone power consumption amount En. For example, the zone power consumption amount En is obtained by multiplying the travel load Ln and the link length.

Figure 5:
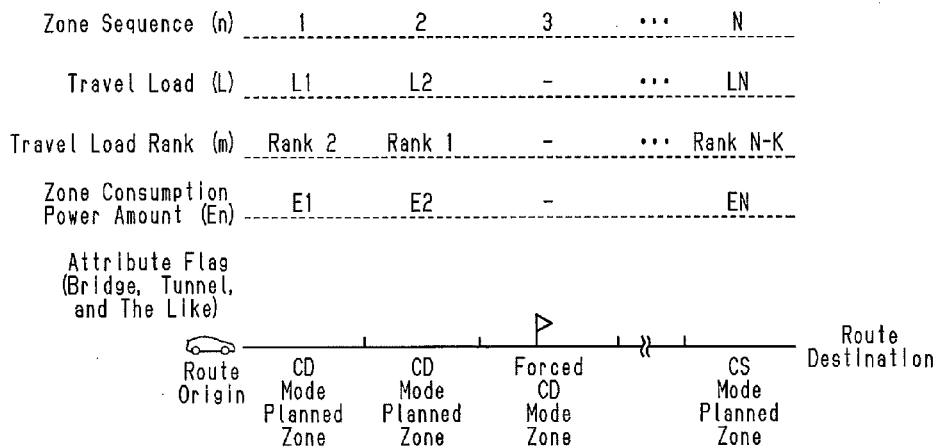
FIG. 5 is a schematic diagram showing one example of the planning of a CD mode and a CS mode in the first embodiment.

FIG. 5 shows an example of plan in which a travel route is divided into an N number of links and the mode planning unit 151 calculates the travel load Ln of each link (L1, L2, ..., LN). Additionally, the mode planning unit 151 uses the calculated travel load Ln to calculate the zone power consumption amount En of each link (E1, E2, ..., EN).

Further, the mode planning unit 151 obtains the SOC of the battery 113 from the monitor unit 112. A total power amount Emax, which is the maximum power amount that can be output from the battery 113, is calculated based on the SOC. Here, the total power amount Emax is a power amount that can be used before reaching the lower limit value of the battery 113. The lower limit value is generally set to be greater than the stored power amount when the charge rate is 0%.

The mode planning unit 151 compares the total power amount Emax with the sum of the entire zone power consumption amount En to determine whether or not the EV traveling can be performed throughout the travel route. When it is determined that the EV traveling can be performed throughout the travel route, the entire zones are set to a CD mode planned zone, in which the CD mode is planned. When the entire zones are set to the CD mode planned zone, the internal combustion engine 131 is driven when the engine is being warmed or when the load is high such as when the accelerator is greatly depressed. However, the internal combustion engine 131 is not driven in order to sustain the SOC of the battery 113 within the predetermined range S1. This decreases the frequency in which the internal combustion engine 131 is driven compared to when the CS mode is set. Thus, the surplus stored power amount of the battery 113 is decreased when the vehicle 100 reaches the route destination.

When the total power amount Emax is less than the sum of the entire zone power consumption amount En, the mode planning unit 151 sets a portion of the entire zones to the CD mode planned zone and the rest of the zones to a CS mode planned zone, in which the CS mode is planned. In this case, the mode planning unit 151 uses the travel load Ln to calculate the zone power consumption amount En. The mode planning unit 151 sequentially assigns the total power amount Emax to the links having smaller travel loads Ln. In this case, each zone is assigned with a power amount corresponding to the zone power consumption amount En of the zone. The mode planning unit 151 sets the zone, to which the total power amount Emax is assigned, to the CD mode planned zone. Here, if the CS mode is planned in a zone having a small travel load Ln, although the EV traveling can be sufficiently performed in the zone, the internal combustion engine 131 would be driven in order to sustain the SOC of the battery 113 within the predetermine range S1. Such a plan increases the frequency in which the internal combustion engine 131 is driven. When the CD mode is planned in the zone having the small travel load Ln, the internal combustion engine 131 is not driven in order to sustain the SOC of the battery 113 within the predetermined range S1. This decreases the frequency in which the internal combustion engine 131 is driven. Therefore, the total power amount Emax is sequentially assigned to the zones having smaller travel loads Ln.

The assignment of the total power amount Emax is terminated when the total power amount Emax becomes less than the lower limit value. As described above, when the total power amount Emax is assigned to as many links as possible, the stored power amount of the battery 113 may be proximate to and above the lower limit value at the route destination. This limits the surplus stored power amount and maximizes the distance of the EV traveling.

The mode planning unit 151 sets the zone from where the assignment of the total power amount Emax is initiated to the zone where the assignment of the total power amount Emax is terminated to the CD mode planned mode. Zones of the travel route where the CD mode planned zone are not set are set to the CS mode planned zone. When the zone is shifted from the CD mode planned zone to the CS mode planned zone, the SOC at the terminal point of the CD mode planned zone is the target value of the SOC.

When the certain structure such as a bridge or a tunnel is located on the travel route, the altitude of the vehicle in the structure cannot be obtained from the altitude information.

Figure 6:
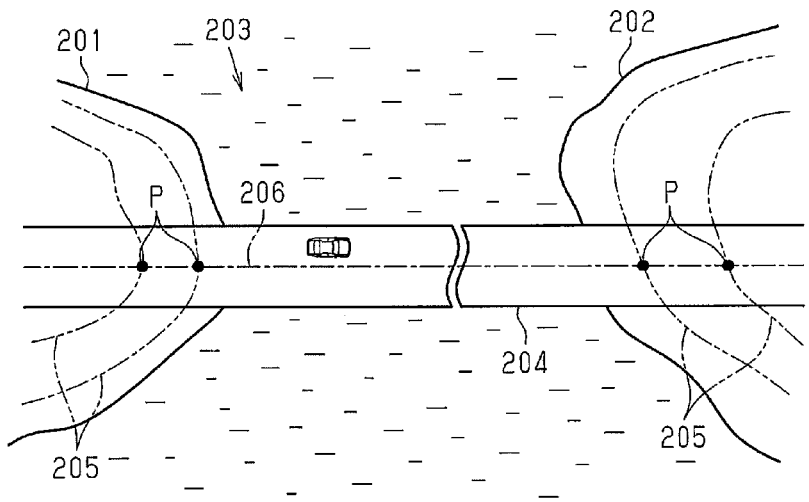
FIG. 6 is a schematic diagram showing one example of a zone including a load unknown portion, in which a travel load cannot be calculated.

For example, as shown in FIG. 6, the altitude information includes information of level lines 205 indicating the height of surfaces of lands 201, 202. Thus, the altitude of the road located on the lands 201, 202 may be obtained, for example, from intersections P of the level lines 205 and a link 206 or the like. However, when a bridge 204 extends across a sea 203 from the land 201 to the land 202, the altitude information does not include the altitude of the bridge 204 or indicates that the altitude of the bridge 204 is "0 m above sea level." Additionally, when a road extends through an undersea tunnel, the altitude information does not include the altitude of the tunnel or indicates that the altitude of the road in the tunnel is "0 m above sea level." Further, when a tunnel extends through a mountain, the altitude information may not include the altitude of the tunnel or indicate that the altitude of the road in the tunnel is the altitude of the mountain surface.

Thus, the travel load Ln of a zone including the certain structure such as a bridge or a tunnel cannot be calculated through the process used to calculate that of a zone in which the altitude can be obtained from the altitude information. Hereafter, a portion in which the altitude is unknown and the travel load cannot be calculated from the altitude information is referred to as the "load unknown portion."

It may be suggested that a data collection vehicle including an altimeter travel the load unknown portion included in the map information 125 to collect information of altitudes. However, it is not easy to collect data in advance from the entire area where altitudes are unknown.

In this regard, when the entire travel route cannot be set to the CD mode planned zone, the mode planning unit 151 determines existence of a link including the load unknown portion such as a bridge or a tunnel from the attribute flag 126e of the link information 126. Additionally, when a link includes the load unknown portion, the mode planning unit 151 plans the CD mode in the link regardless of the travel load Ln. More specifically, the CD mode is planned independently from the CD mode planned zone, which is planned by sequentially assigning the total power amount Emax to the zones having smaller travel loads Ln.

If the CS mode is planned in a link including the load unknown portion, the internal combustion engine 131 may be driven in the link in order to maintain the SOC of the battery 113 within the predetermined range S1 in spite of the actual travel load of the link being small. Traveling a zone having a small travel load in the CS mode increases the frequency in which the internal combustion engine 131 is driven.

However, as described above, when the CD mode is planned in a link including the load unknown portion, priority is given to the EV traveling. This increases the consumption power amount of the link compared to when the CS mode is planned. Consequently, the surplus stored power amount of the battery 113 is limited at the route destination compared to the when the CS mode is planned in the link having the load unknown portion. Additionally, even when the actual travel load of the link is large but the link is set to the CD mode, the internal combustion engine 131 is driven in accordance with an output required by the driver. Therefore, it is preferred that the CD mode be planned in a link including the load unknown portion.

The travel load Ln of a link including the load unknown portion is unknown. Thus, even if the zone power consumption amount En is calculated based on the travel load excluding the load unknown portion or the average travel load of the CD mode planned zone, the calculated zone power consumption amount En may greatly differ from the actual consumption power amount. When the calculated zone power consumption amount En is greatly larger than the actual consumption power amount, the surplus power is increased when the vehicle 100 reaches the route destination. Thus, when planning the CD mode in a link including the load unknown portion, the hybrid controller 110 does not assign the total power amount Emax to the link. As described above, although the CD mode is planned in a link including the load unknown portion, the procedures differ from those for planning the CD mode planned zone. Such a link is referred to as the forced CD mode zone and will now be described.

Figure 7:
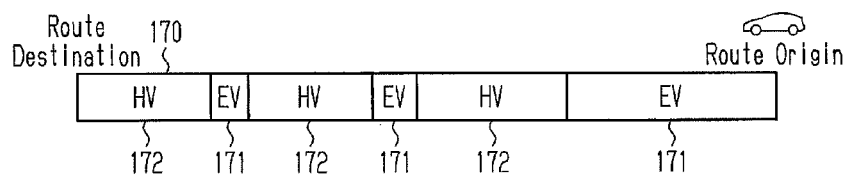
FIG. 7 is a diagram showing one example of a display content informing the planning of the CD mode and the CS mode in the first embodiment.

Additionally, as shown in FIG. 7, when obtaining information related to a travel plan from the mode planning unit 151, the mode display unit 153 forms information for indicating the content of the travel plan and transmits the information to the HMI 123. The HMI 123 shows a meter image 170 on the display or the like based on the information obtained from the mode display unit 153.

In the meter image 170, each CD mode planned zone is indicated as an EV zone 171, and each CS mode planned zone is indicated as a HV zone 172. In the present embodiment, the forced CD mode zone is indicated as the EV zone 171. However, only the CD mode planned zone may be indicated as the EV zone 171 without indicating the forced CD mode zone as the EV zone 171. In this case, the forced CD mode zone is indicated, for example, as the same zone as the preceding or succeeding zone.

The procedures of a travel assist process performed by the travel assist unit 150 will now be described in detail with reference to FIGS. 8 and 9. Here, the travel assist process is started when a travel route is set from the route origin to the route destination, which is set by a person in the vehicle.

Figure 8:
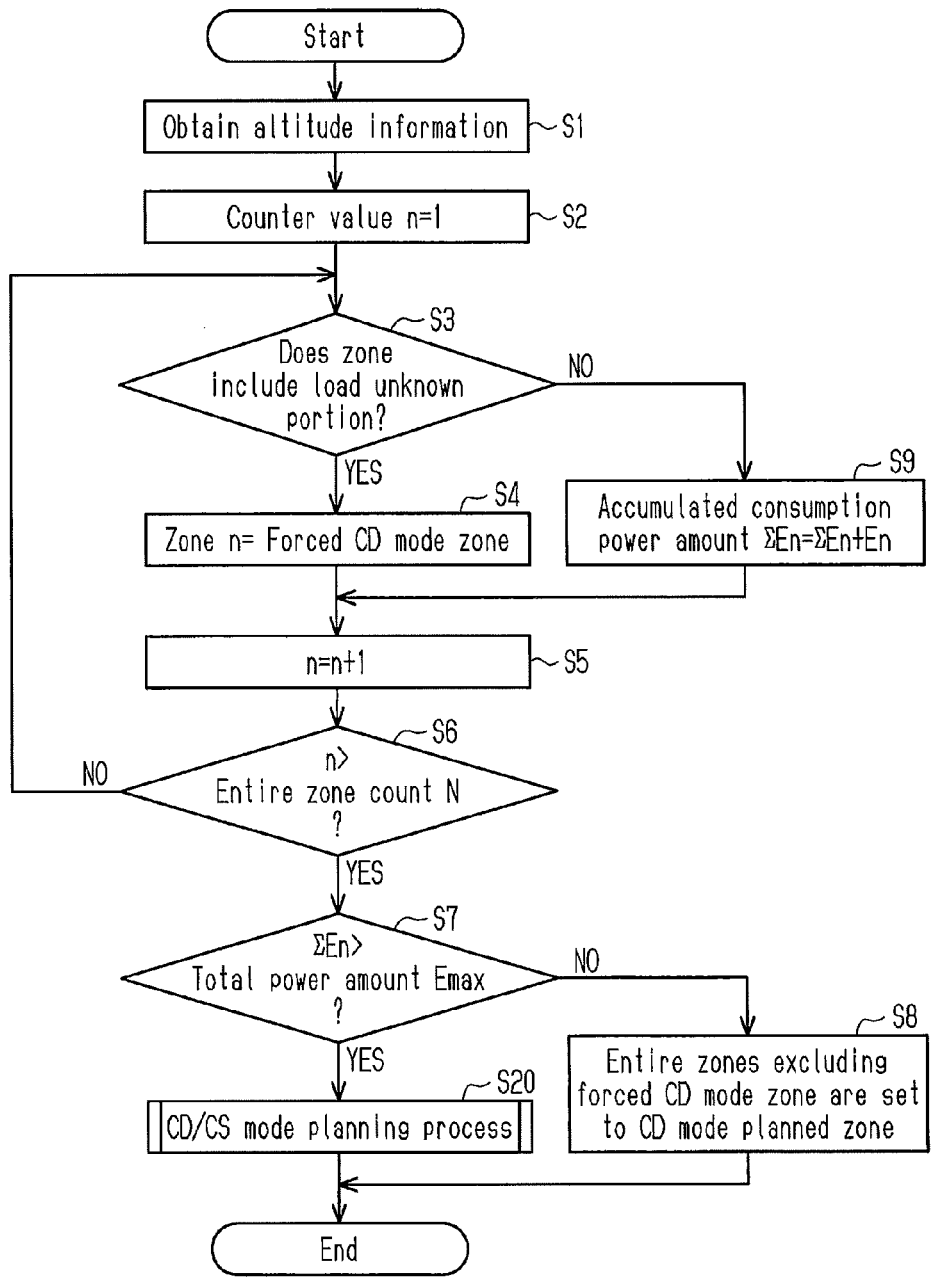
FIG. 8 is a flowchart showing the procedures of a travel assist process in the first embodiment.

As shown in FIG. 8, when the travel assist process is started, the mode planning unit 151 obtains the altitude information including the travel route (step S1). Also, the mode planning unit 151 initializes a counter value n to be 1 to count up the zone of the travel route (step S2).

Additionally, the mode planning unit 151 determines whether or not the load unknown portion is located in the zone where the counter value n is 1 when the links included in the travel zone are sorted from the route origin (step S3). In this case, the mode planning unit 151 determines whether or not the attribute flag 126e is "1." As described above, when the attribute flag 126e is "1," the certain structure such as a bridge or a tunnel is located in the corresponding zone.

When determining that the attribute flag 126e is "1" and that the load unknown portion is located in the zone (step S3: YES), the mode planning unit 151 sets the zone to the forced CD mode zone (step S4).

Then, the mode planning unit 151 increments the counter value n (step S5) and determines whether or not the counter value n is greater than an entire zone count N, which is the number of the entire zones included in the travel route (step S6). When the counter value n is less than or equal to the entire zone count N (step S6: NO), the process returns to step S3.

When the mode planning unit 151 determines that the attribute flag 126e is "0" and that the zone does not include the load unknown portion (step S3: NO), the zone power consumption amount En is calculated using the altitude information and the link information 126 associated with the travel route. At this time, the travel assist unit 150 calculates the travel load Ln based on the altitude information and the link information 126. Additionally, the travel assist unit 150 calculates the zone power consumption amount En using the travel load Ln and the length of the link.

When the zone power consumption amount En is calculated, the mode planning unit 151 adds the zone power consumption amount En to an accumulated consumption power amount ΣEn (step S9). Here, the accumulated consumption power amount ΣEn is initialized to be "0" before the travel assist process is started.

The mode planning unit 151 increments the counter value n (step S5) and determines whether or not the counter value n is greater than the entire zone count N (step S6). In this manner, until the last zone is reached in the sequence of the travel route, the forced CD mode zone is planned or the zone power consumption amount En is added to the accumulated consumption power amount ΣEn.

Then, the mode planning unit 151 obtains the SOC of the battery 113 from the monitor unit 112. The mode planning unit 151 determines whether or not the accumulated consumption power amount ΣEn is greater than the total power amount Emax, which is obtained by multiplying the fully charged power amount of the battery 113 and the SOC (step S7).

When determining that the accumulated consumption power amount ΣEn is less than or equal to the total power amount Emax based on the stored power amount (step S7: NO), the mode planning unit 151 sets the entire zones excluding the forced CD mode zone to the CD mode planned zone (step S8). Thus, the CD mode is planned throughout the travel route.

When determining that the accumulated consumption power amount ΣEn is greater than the total power amount Emax based on the stored power amount (step S7: YES), the CD/CS mode planning process is performed to set each of the entire zones excluding the forced CD mode zone to the CD mode or the CS mode (step S20).

CD/CS Mode Planning Process

The CD/CS mode planning process will now be described with reference to FIG. 9. The mode planning unit 151 initializes an accumulated consumption power amount ΣEm, which is used when the total power amount Emax is assigned to the zones (step S201). Also, the mode planning unit 151 sorts the zones, in which the zone power consumption amount En is calculated in step S9, in order from zones having smaller travel loads Ln (step S202). Additionally, the mode planning unit 151 sequentially applies ranks starting from the "1st rank" to smaller travel loads Ln. Further, the mode planning unit 151 sets "1" in a rank m, which is a counter value for counting up the rank (step S203).

The mode planning unit 151 adds the zone power consumption amount Em of the zone ranked "1" to the accumulated consumption power amount ΣEm and updates the accumulated consumption power amount ΣEm (step S204). The travel assist unit 150 determines whether or not the accumulated consumption power amount ΣEm is greater than the total power amount Emax based on the stored power amount (step S205).

When the travel assist unit 150 determines that the accumulated consumption power amount ΣEm is less than or equal to the total power amount Emax based on the stored power amount (step S205: NO), the rank m is incremented (step S208) and the process returns to step S204. Then, steps S204 and S205 are performed on the zone ranked "2."

When the travel assist unit 150 determines that the accumulated consumption power amount ΣEm is greater than the total power amount Emax based on the stored power amount (step S205: YES), the zones ranked "1" to "m" are set to the CD mode planned zone (step S206). In this manner, when the zones ranked "1" to "m" are set to the CD mode planned zone, the stored power amount is insufficient in the zone ranked "m" based on the plan. However, the stored power amount of the battery 113 is not surplus at the route destination. Additionally, the travel assist unit 150 sets the remaining zones to the CS mode planned zone (step S207) and ends the CD/CS mode planning process.

When the vehicle 100 starts traveling along the travel route, the hybrid controller 110 controls the internal combustion engine 131 and the second motor generator 142 in accordance with the mode set in each zone.

Here, the total power amount Emax is not assigned to the forced CD mode zone. Thus, when the power is consumed in the CD mode planned zone in accordance with the plan, the power may be insufficient relative to the plan, for example, in the CD mode planned zone in the latter half of the travel route. However, at least the surplus stored power amount of the battery 113 may be limited at the route destination. This decreases the frequency in which the internal combustion engine 131 is driven and reduces the consumption fuel amount and emissions.

Accordingly, the present embodiment of an information processor for a vehicle has the advantages described below.

(1) A zone including the load unknown portion is set to the CD mode, in which the consumption power amount is larger than when traveling in the CS mode. Thus, for example, when the actual travel load of the zone including the load unknown portion is small, the zone will not be set to the CS mode, in which the consumption power amount is relatively small. Therefore, when the vehicle 100 travels along the travel route and the mode is selected as planned, the consumption of the stored power amount is increased. This limits a situation in which the actual stored power amount is surplus relative to the planned stored power amount when the vehicle 100 reaches the route destination. Thus, even when the load unknown portion exists, a plan is formed to increase the consumption of the stored power.

(2) The total power amount Emax is assigned only to a zone in which the zone power consumption amount can be calculated based on the travel load. Thus, when a zone including the load unknown portion is set to the CD mode, the total power amount Emax is not assigned to the zone. Therefore, when the vehicle is traveling, the stored power amount may be insufficient relative to the planned stored power amount. However, the surplus stored power amount of the battery 113 is limited when the vehicle reaches the route destination.

(3) The information related to each zone is the altitude information. The altitude information is basically geographic information and thus may not include the altitude of a road that is located, for example, in a structure such as a bridge or a tunnel. When calculating the travel load using the altitude of the road, the travel assist unit 150 sets the CD mode in the load unknown portion, in which the altitude is unknown. This increases the consumption of the stored power regardless of the environment of the traveling vehicle such as a mountain or a downtown and limits the surplus stored power amount of the battery 113 at the route destination.

Second Embodiment

A second embodiment of an information processor for a vehicle will now be described with reference to FIGS. 10 and 11. Here, the description will focus on the differences from the first embodiment. The information processor of the present embodiment basically has the same configuration as that of the first embodiment. The overlap will not be described.

The present embodiment and the first embodiment both set a zone including the load unknown portion, in which the travel load cannot be calculated, to the CD mode. However, the present embodiment differs from the first embodiment in that the zone including the load unknown portion is set to the CD mode if the proportion of the load unknown portion is greater than or equal to a threshold value.

Figure 10:
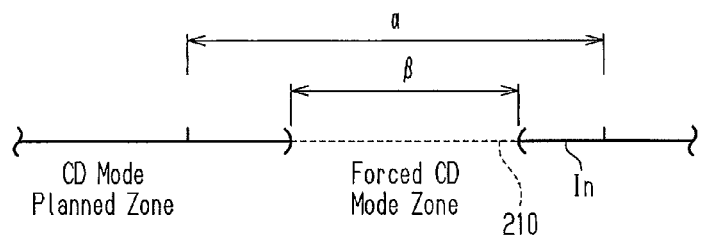
FIG. 10 is a conceptual diagram showing the load unknown portion proportion of a zone in a second embodiment.
Figure 11:
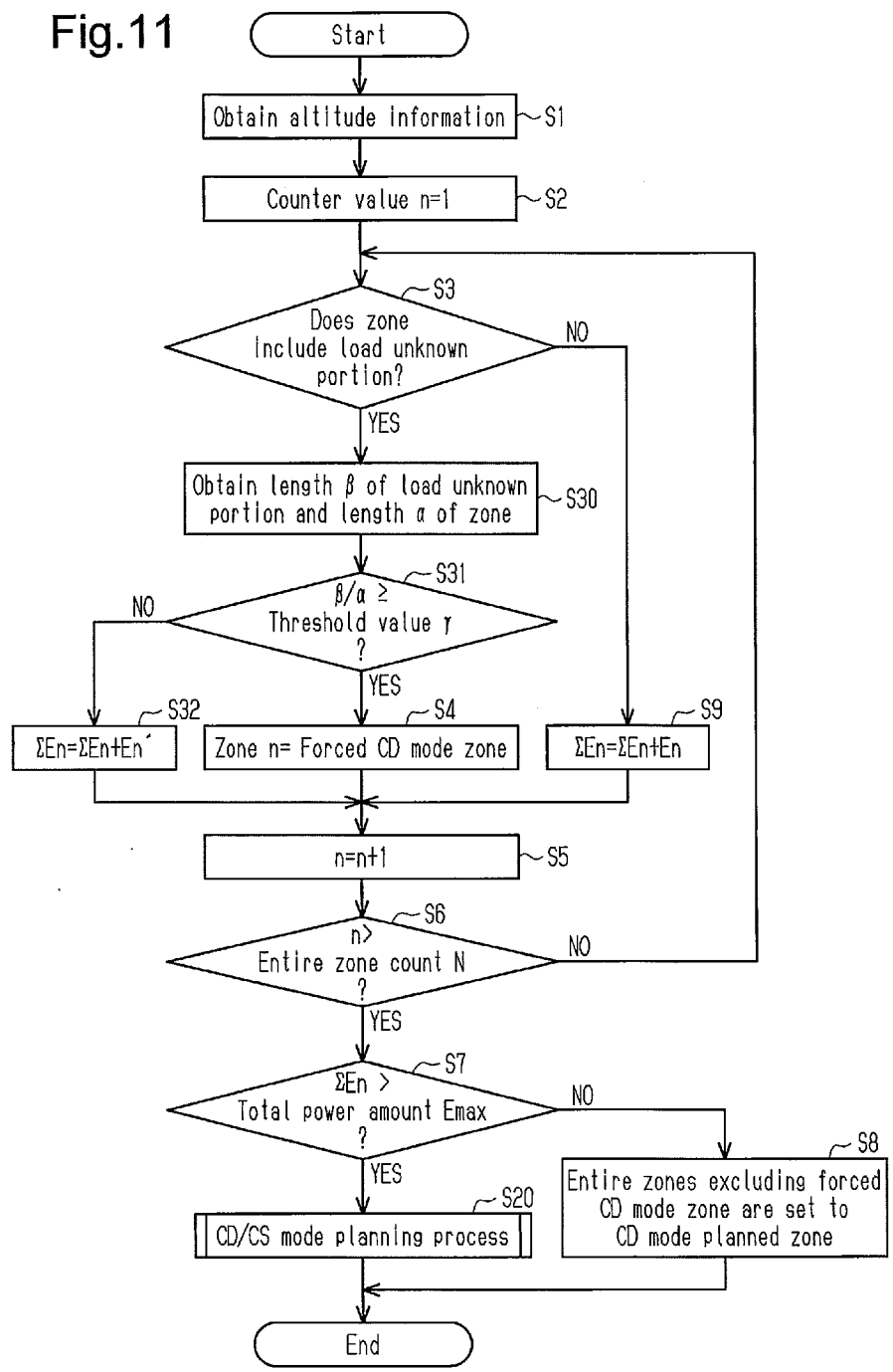
FIG. 11 is a flowchart showing the procedures of a travel assist process in the second embodiment.

As shown in FIG. 10, when a zone In includes a load unknown portion 210 such as a bridge or a tunnel, the mode planning unit 151 subtracts the length β of the load unknown portion 210 from the overall length α of the zone In to calculate the proportion β/α. The length β of the load unknown portion 210 is included in the attribute information 126f of the link information 126 or the like.

When the proportion β/α is greater than or equal to a threshold value γ, the travel assist unit 150 sets the zone In to the forced CD mode zone. The threshold value γ is set, for example, to 0.5, which indicates one-half of the zone, or above.

More specifically, the calculated travel route of the zone is the average travel route of the entire zone. Thus, when the proportion β/α is less than the threshold value γ and the load unknown portion occupies a small proportion, the load of the load unknown portion slightly affects the travel load of the entire zone. Therefore, when the proportion β/α of the load unknown portion is less than the threshold value γ, the travel load is calculated from the altitude of the zone that is free from the load unknown portion. When the proportion β/α of the load unknown portion is greater than or equal to the threshold value γ, the zone is set to the forced CD mode zone.

The procedures of the travel assist process, which is performed by the travel assist unit 150, will now be described in detail with reference to FIG. 11. In the travel assist process of the present embodiment, the procedures for planning a zone that is free from the load unknown portion are the same as those of the first embodiment.

In step S3, when determining that the attribute flag 126*e* is "1" and a load unknown portion is located in the zone (step S3: YES), the mode planning unit 151 obtains the length β of the load unknown portion and the length α of the zone (step S30).

The mode planning unit 151 calculates the proportion β/α of the length β of the load unknown portion to the length α of the zone and determines whether or not the proportion β/α is greater than or equal to the threshold value γ (step S31).

When determining that the proportion β/α is greater than or equal to the threshold value γ (step S31: YES), the mode planning unit 151 sets the zone to the forced CD mode zone (step S4).

When determining that the proportion β/α is less than the threshold value γ (step S31: NO), the mode planning unit 151 calculates a zone power consumption amount En' without using the travel load of the load unknown portion. In this case, the travel assist unit 150 calculates the travel load based on the altitude or like of the zone that is free from the load unknown portion. When calculating the zone power consumption amount En', the travel assist unit 150 adds the zone power consumption amount En' to the accumulated consumption power amount ΣEn and updates the accumulated consumption power amount ΣEn (step S32).

Accordingly, the present embodiment of an information processor for a vehicle has the advantage described below in addition to advantages (1) to (3).

(4) It is assumed that the load unknown portion of a zone may be short relative to the overall length of the zone depending on how the zone is divided. The travel assist unit 150 sets the CD mode only in a zone in which the proportion β/α of the load unknown portion is greater than or equal to the threshold value γ, which is a predetermined proportion. This prevents a situation in which the CD mode is forcibly set in a zone in which the travel load of the load unknown portion subtly affects the average travel load of the entire zone. Thus, the surplus stored power amount is limited when the vehicle reaches the route destination. Also, when the vehicle is traveling, situations are limited in which the stored power amount is insufficient relative to the planned stored power amount.

Third Embodiment

A third embodiment of an information processor for a vehicle will now be described with reference to FIGS. 12 and 13. Here, the description will focus on the differences from the first embodiment. The information processor of the present embodiment basically has the same configuration as that of the first embodiment. The overlap will not be described.

The present embodiment and the first embodiment both set a zone including the load unknown portion, in which the travel load cannot be calculated, to the CD mode. However, the present embodiment differs from the first embodiment in that a zone including a load unknown portion is divided into the load unknown portion and a portion other than the load unknown portion. The load unknown portion is set to the forced CD mode zone. In the portion other than the load unknown portion, the travel load is calculated and the mode is set.

Figure 12:
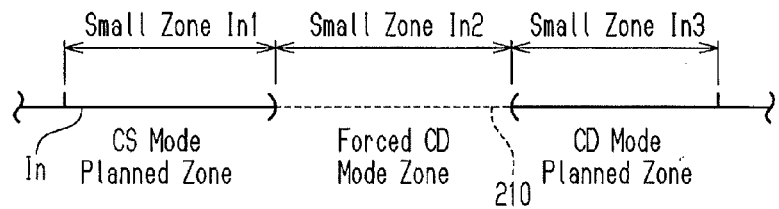
FIG. 12 is a conceptual diagram showing a zone including a load unknown portion in a third embodiment.
Figure 13:
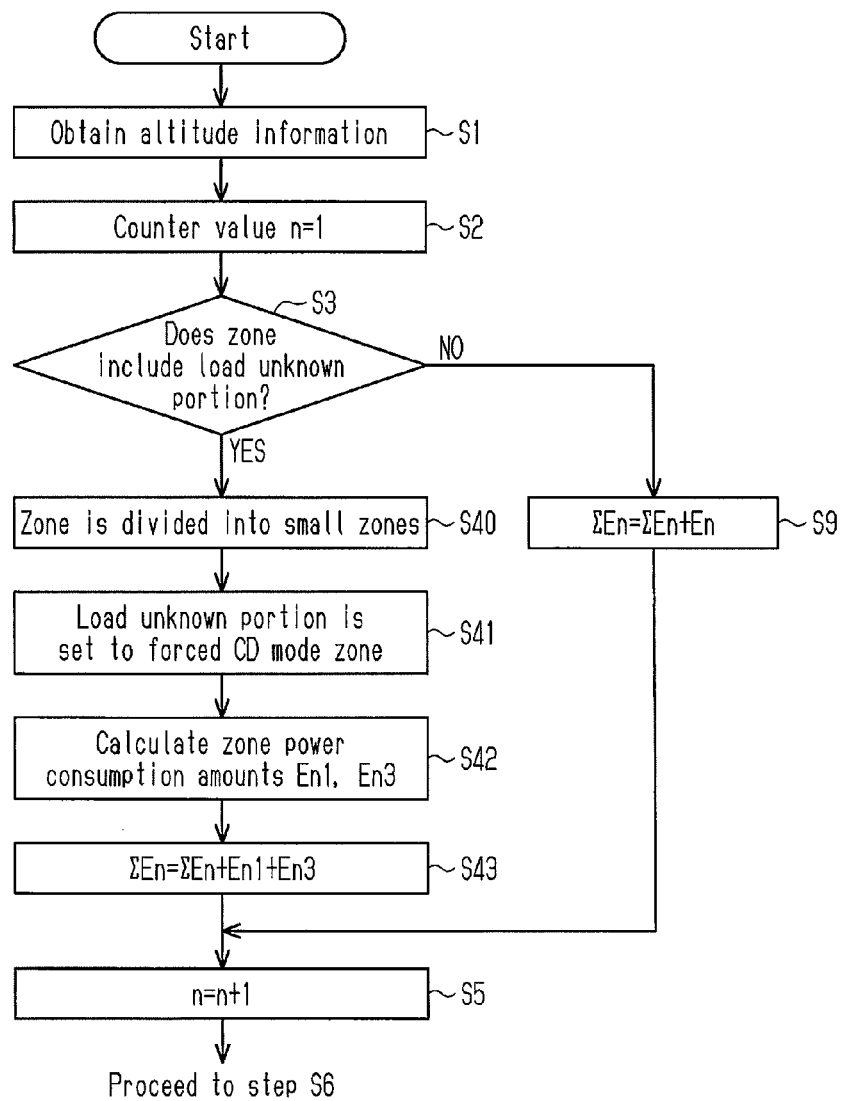
FIG. 13 is a flowchart showing the procedures of a travel assist process in the third embodiment.

As shown in FIG. 12, when a zone In includes the load unknown portion 210 such as a bridge or a tunnel, the mode planning unit 151 divides the zone In into a small zone In2, which is the load unknown portion 210, and small zones In1, In3, which are free from the load unknown portion 210. FIG. 12 illustrates an example in which the small zone In2, or the load unknown portion 210, is located between the small zones In1, In3. However, a small zone free from the load unknown portion 210 may be located in only the front or the rear of the small zone In2, or the load unknown portion 210.

The mode planning unit 151 plans the forced CD mode zone in the small zone In2, or the load unknown portion 210. The travel assist unit 150 obtains the altitudes of the small zones In1, In3, which are free from the load unknown portion 210, from the altitude information and calculates the travel load of each of the small zones In1, In3. Either the CD mode or the CS mode is planned in correspondence with each calculated travel load.

The procedures of the travel assist process, which is performed by the travel assist unit 150, will now be described in detail with reference to FIG. 13. In the travel assist process of the present embodiment, the procedures for planning a zone that is free from the load unknown portion are the same as those of the first embodiment.

In step S3, when determining that the attribute flag 126*e* is "1" and that a load unknown portion is located in the zone (step S3: YES), the mode planning unit 151 divides the zone into small zones (step S40). The small zones are divided in a small zone of the load unknown portion and one or more small zones that are free from the load unknown portion. Such small zones are treated as a single zone in the same manner as a zone that does not include the load unknown portion.

When the zone is divided into, for example, the small zone In2, which corresponds to the load unknown portion, and the small zones In1, In3, which are free from the load unknown portion, the travel assist unit 150 sets the small zone In1, which corresponds to the load unknown portion, to the forced CD mode zone in (step S41). Here, when the zone includes a plurality of load unknown portions, a plurality of small zones corresponding to the load unknown portions are set to the forced CD mode zone. Also, the travel assist unit 150 obtains the altitudes of the small zones In1, In3, which are free from the load unknown portion, from the altitude information to calculate the travel load of each of the small zones In1, In3 and uses the calculated travel loads to calculate zone power consumption amounts En1, En3 (step S42).

The travel assist unit 150 adds the zone power consumption amounts En1, En3 to the accumulated consumption power amount ΣEn to update the accumulated consumption power amount ΣEn (step S43) and increments the counter value n (step S5).

When all of the zone power consumption amounts En are accumulated in the accumulated consumption power amount ΣEn and the accumulated consumption power amount ΣEn is less than or equal to the total power amount Emax, the CD mode planned zone is set in the small zones In1, In3, which are free from the load unknown portion.

When the accumulated consumption power amount ΣEn, in which all of the zone power consumption amounts En are accumulated, is greater than the total power amount Emax, the CD/CS mode planning process is performed (refer to step S20 of FIG. 8). In this case, a plurality of zones including the small zones In1, In3 is sorted in accordance with the travel load and sequentially assigned with the total power amount Emax so that the CD mode or the CS mode is set.

When a zone including a load unknown portion is divided into small zones, and the CD mode or the CS mode is planned in each small zone, the stored power amount of the battery 113 will not be surplus at the route destination. Additionally, the range of the distance in which the mode is planned without using the travel load may be minimized to decrease the difference between the actual and planned consumption of the stored power amount of the battery 113.

Accordingly, the present embodiment of an information processor for a vehicle has the advantage described below in addition to advantages (1) to (3).

(5) The travel assist unit 150 treats the load unknown portion and a portion other than the load unknown portion as separate zones. Thus, when a zone includes the load unknown portion, the mode is planned in the portion other than the load unknown portion in accordance with the travel load. This limits the surplus stored power amount when the vehicle 100 reaches the route destination and insufficiency in the stored power amount relative to the planned stored power amount when the vehicle 100 is traveling.

Other Embodiments

It should be apparent to those skilled in the art that the present disclosure may be embodied in many other specific forms without departing from the scope of the disclosure. Particularly, it should be understood that the present disclosure may be embodied in the following forms.

Figure 9:
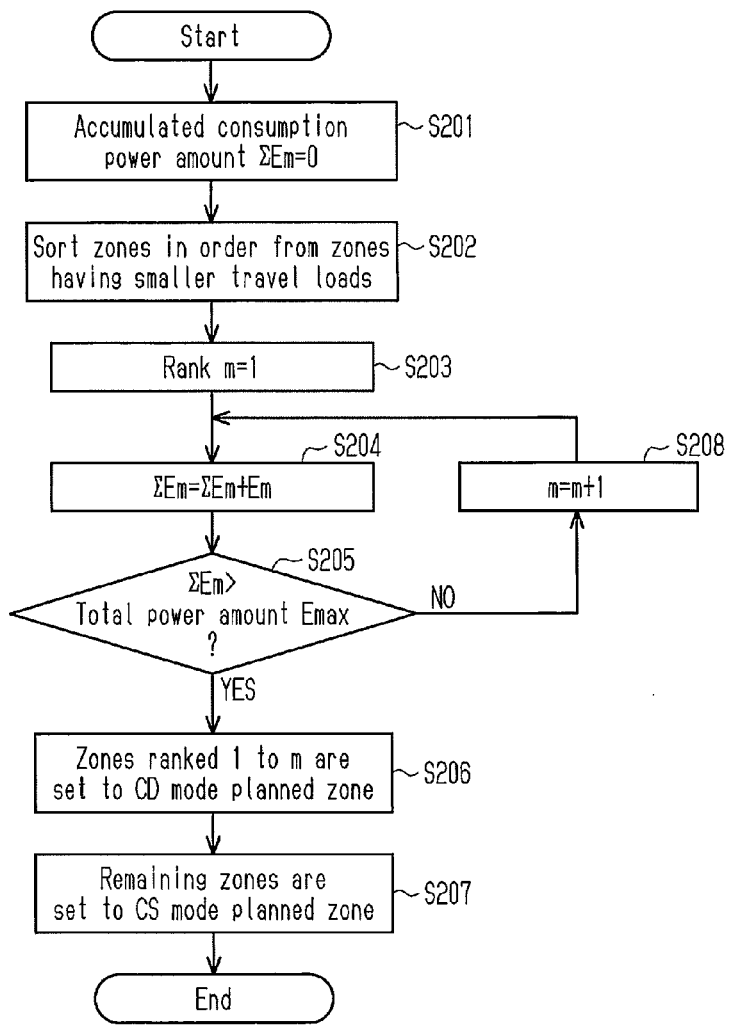
FIG. 9 is a flowchart showing the procedures of a CD/CS mode planning process, which is a portion of the travel assist process in the first embodiment.

In step S205 of FIG. 9, when the travel assist unit 150 determines that the accumulated consumption power amount ΣEm is greater than the total power amount Emax based on the stored power amount (step S205: YES), the zones ranked "1" to "m" are set to the CD mode planned zone (step S206). Instead, the zones ranked "1" to "m−1" may be set to the CD mode planned zone. In this case, a plan may be formed so that the stored power amount does not become insufficient in the zone ranked "m−1," which is the lowest rank of the CD mode planned zones. However, in this plan, the stored power amount of the battery 113 is surplus at the route destination. Therefore, to prevent the surplus stored power amount at the route destination, it is preferred that the zones ranked "1" to "m" be set to the CD mode planned zone.

The vehicle 100 may include a sensor capable of obtaining an altitude such as an altimeter or a GPS device capable of three-dimensional measurement. In this case, the vehicle 100 is capable of obtaining the altitude of the travel route while traveling. The obtained altitude is stored in association with an absolute position or position information such as a link. When the altitude of a zone is obtained, it is not determined that the zone includes a load unknown portion even when the attribute flag 126*e* associated with the zone is "1."

In each of the above embodiments, existence of a load unknown portion is determined based on the value of the attribute flag 126*e*. Instead, for example, when altitudes are associated with a plurality of interpolation points of a link, existence of a load unknown portion may be determined based on whether or not an interpolation point is not associated with an altitude or based on the reliability of an altitude associated with an interpolation point. In this case, the travel assist unit 150 determines that a load unknown portion exists when an altitude is not associated with at least one of interpolation points or when the reliability of the altitude associated with the interpolation point of a structure is low. Additionally, the link information 126 may include an altitude information flag, which indicates whether or not an altitude unknown portion exists. In this case, it may be determined that the altitude unknown portion exists, for example, when the altitude information flag is "0."

In each of the above embodiments, the total power amount Emax is not assigned to the forced CD mode zone.

However, the total power amount Emax may be assigned to the force CD mode zone when the surplus stored power amount can be limited at the route destination. For example, when the smallest travel load for planning the CD mode is used to calculate a zone power consumption amount En, the zone power consumption amount En may be assigned.

The altitude information may be obtained from a data server capable of communicating with the vehicle 100. In this case, the latest altitude information may be used. Additionally, when the data server can collect altitude information based on the travel history from a large number of unspecified vehicles, the number of zones including a load unknown portion may be reduced.

In each of the above embodiments, the altitude information is used to calculate a travel load, and a portion in which the altitude cannot be obtained is served as a load unknown portion. Instead, the travel load may be calculated using traffic information including a jam level and an average movement speed associated with each zone. In this case, in a zone of a heavy traffic jam, the travel speed is reduced, and a small travel load is calculated. In a zone free from a traffic jam, the travel load is calculated based on the average movement speed included in the link information. Here, a large travel load is calculated in a zone (link) of a high average movement speed, and a small travel load is calculated in a zone (link) of a high average movement speed. When the travel load is calculated in this manner, a portion in which the traffic information cannot be obtained may be served as a load unknown portion. Additionally, when a structure such as a bridge or a tunnel or a road is newly built and the link information has not been reflected in the map information 125, the link cost cannot be used to calculate the travel load. In this case, a portion in which the link information has not been updated may be served as a load unknown portion.

In each of the above embodiments, the mode display unit 153 functions to show the meter image 170 on the HMI 123. The meter image 170 only needs to indicate the proportion and sequence of the CD mode and CS mode and may be changed to an image other than the meter image 170 shown in FIG. 7. Further, instead of showing the meter image 170, the drive sources may be controlled in accordance with the mode plan.

In each of the above embodiments, the travel assist unit 150 is arranged in the hybrid controller 110. Instead, the travel assist unit 150 may be arranged in the navigation system 120. Alternatively, the travel assist unit 150 may be arranged in another controller, which may be a potable information terminal and brought in the vehicle 100.

The travel assist unit 150 may be arranged in a server (center) capable of communicating with the vehicle 100 through a wireless communication network. The server obtains the travel route of the vehicle 100 and the SOC (stored power amount) of the battery 113 through the wireless communication network.

In each of the above embodiments, the travel assist unit 150 calculates the travel load using the altitude. Instead, the travel load may be predetermined and calculated. The predetermined travel load may be included in the link information 126 or stored separately from the link information 126. In this case, when the travel assist unit 150 determines that a zone includes a load unknown portion such as a bridge or a tunnel based on the attribute flag 126*e* or the like, the travel load of the zone is determined having low accuracy and not used for planning the mode. Alternatively, when a zone includes a bridge or a tunnel and the travel load cannot be calculated, the travel load does not have to be stored in the link information 126 or the like.

In each of the above embodiments, the CD mode is configured to give priority to the driving of the second motor generator 142 and consume the power of the battery 113 while limiting the driving of the internal combustion engine 131. Instead, the CD mode may be configured to drive the second motor generator 142 and consume the power of the battery 113 while prohibiting the driving of the internal combustion engine 131. The prohibition of the driving of the internal combustion engine 131 includes deactivation of all cylinders. In this case, when the second motor generator 142 is not enough to generate power for traveling, the mode may be changed to the CS mode.

In each of the above embodiments, the information processor is mounted on the vehicle 100, in which at least some of drive force of the internal combustion engine 131 is converted into power to charge the battery 113. Instead, the vehicle may be configured so that drive force of the internal combustion engine 131 is not converted into power.

A vehicle on which an information processor for a vehicle is mounted only needs to be a hybrid vehicle that includes a plurality of drive sources and is capable of charging a storage battery from an external power supply device. For example, the vehicle may be a hybrid vehicle of a so-called series hybrid type, in which the motor drives the wheels and drive force of the internal combustion engine is used only to generate power. Alternatively, the vehicle may be a hybrid vehicle of a so-called parallel hybrid type, in which the motor and the internal combustion engine both directly drive the wheels.

The battery 113 only needs to be a power supply apparatus capable of charging and discharging and may include, for example, a capacitor other than a secondary battery.

In each of the above embodiments, the vehicle 100 is a plug-in hybrid automobile. Instead, the vehicle 100 may be a hybrid vehicle in which a stored power amount is increased. The process for planning the mode, which has been described above, is applicable to such a vehicle when a travel plan is formed to decrease the stored power amount of the battery to the planned stored power amount at the route destination.

The present examples and embodiments are to be considered as illustrative and not restrictive, and the disclosure is not to be limited to the details given herein, but may be modified within the scope and equivalence of the appended claims.

While not restricted thereto, an exemplary embodiment can be embodied as computer-readable code on a computer-readable recording medium. The computer-readable recording medium is any data storage device that can store data that can be thereafter read and executed by a computer system or microprocessor. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

The invention claimed is:

1. An information processor for use with a vehicle, wherein the vehicle includes an internal combustion engine and a motor, which function as drive sources, and a storage battery, which functions as a power source of the motor, the information processor configured to:
    obtain a travel route from a route origin to a route destination, wherein the travel route includes a plurality of zones;
    obtain zone information used to calculate a travel load of each of the zones included in the travel route;
    calculate the travel load of each of the zones, which are included in the travel route, using the zone information; and
    set each zone to one of a charge depleting mode and a charge sustaining mode based on the calculated travel load, wherein:
        in the charge depleting mode, the vehicle is driven by at least the motor,
        in the charge sustaining mode, the vehicle is driven by at least one of the internal combustion engine and the motor in such a manner so as to maintain a maximum level of a stored power amount of the storage battery, and
        at least one of the zones includes a load unknown portion in which the travel load cannot be calculated, a proportion of a length of the load unknown portion relative to an overall length of the zone including the load unknown portion is greater than or equal to a predetermined proportion, and the information processor is configured to set the at least one zone including the load unknown portion to the charge depleting mode.

2. The information processor according to claim 1, further configured to:
    calculate a zone power consumption amount for each zone based on the calculated travel load, wherein the zone power consumption amount is an amount of power that is consumed when the vehicle travels in the charge depleting mode;
    obtain a total power amount that is allowed to be output from the storage battery before reaching a lower limit value of the stored power amount;
    assign one or more zones, in order from zones having smaller loads, with a power amount of the corresponding zone power consumption amount, wherein the power amount of the corresponding zone power consumption amount is taken from the obtained total power amount;
    set the one or more zones, to which a power amount taken from the total power amount is assigned, to the charge depleting mode; and
    in addition to the one or more zones set to the charge depleting mode by assigning the power amount taken from the total power amount, when a zone including the load unknown portion is set to the charge depleting mode, the information processor is configured not to assign a power amount taken from the total power amount to the zone including the load unknown portion.

3. The information processor according to claim 1, wherein
    the information processor is configured to set the load unknown portion to the charge depleting mode, and
    in the zone including the load unknown portion, the information processor is configured to set a portion other than the load unknown portion to one of the charge depleting mode and the charge sustaining mode based on the travel load of the portion other than the load unknown portion.

4. A control method of a vehicle by an information processor for use with the vehicle, wherein the vehicle includes an internal combustion engine and a motor, which function as drive sources, and a storage battery, which functions as a power source of the motor, the control method comprising:

obtaining a travel route from a route origin to a route destination, wherein the travel route includes a plurality of zones;

obtaining zone information used to calculate a travel load of each of the zones included in the travel route; and calculating the travel load of each of the zones, which are included in the travel route, using the zone information;

setting each zone to one of a charge depleting mode and a charge sustaining mode based on the calculated travel load; and giving, in the charge depleting mode, priority to traveling in which only the motor is driven;

driving, in the charge sustaining mode, at least one of the internal combustion engine and the motor to sustain a stored power amount of the storage battery; and when at least one of the zones includes a load unknown portion in which the travel load cannot be calculated, and a proportion of a length of the load unknown portion relative to an overall length of the zone including the load unknown portion is greater than or equal to a predetermined proportion, setting the zone including the load unknown portion to the charge depleting mode.

* * * * *

UNITED STATES PATENT AND TRADEMARK OFFICE
CERTIFICATE OF CORRECTION

PATENT NO. : 9,896,085 B2  
APPLICATION NO. : 15/018154  
DATED : February 20, 2018  
INVENTOR(S) : Keisuke Morisaki Page 1 of 1

It is certified that error appears in the above-identified patent and that said Letters Patent is hereby corrected as shown below:

On the Title Page

Item (71), Line (2), please change "(TW)" to --(JP)--.

Signed and Sealed this  
Eighth Day of May, 2018

Andrei Iancu  
*Director of the United States Patent and Trademark Office*